Patented Oct. 23, 1951

2,572,578

UNITED STATES PATENT OFFICE 2,572,578

METHOD OF PREPARING SILICA SOLS

Henry S. Trail, Quincy, Mass., assignor to Monsanto Chemical Company, St. Louis, Mo., a corporation of Delaware No Drawing. Application December 31, 1948, Serial No. 68,723

8 Claims. (Cl. 252—313)

The present invention relates to improved processes for preparing silica aquasols and particularly for preparing silica aquasols from silica aquagels.

One object of the present invention is to provide improved processes for the conversion of silica aquagels to silica aquasols in a closed system with increased efficiency.

A further object of this invention is to provide processes for converting silica aquagels to silica aquasols in a closed system such as an autoclave and to substantially prevent the formation of scale on the heat exchange surfaces of such autoclave.

A further object of this invention is to substantially eliminate the formation of mud or gelatinous precipitate in converting silica aquagels to silica aquasols in a closed system such as an autoclave.

A further object of this invention is to provide processes for the conversion of silica aquagels to silica aquasols wherein the pH of the aquasol product is readily controlled.

Still further objects and advantages of this invention will appear from the following description and the appended claims.

The present invention is carried out, in general, by heating a substantially neutral silica aquagel, which is substantially free of salts or electrolytes, with a heat stable, alkaline reacting silica aquasol at temperatures above 125° C. in a closed system such as an autoclave, pressure resistant vessel and the like, under such conditions that boiling or ebullition is substantially prevented. The silica aquasol used should contain an amount of free basic compound, based on the silica present in the silica aquasol, which is sufficient to convert substantially all of the silica aquagel to silica aquasol. Moreover, sufficient aquasol should be present to provide rapid transfer of heat from the autoclave walls to the mixture of silica aquagel and silica aquasol.

After substantially all of the silica aquagel is thus converted to silica aquasol, heating is generally discontinued and the contents of the closed system e. g. autoclave, are blown out, utilizing the pressure which is generated within the system for this purpose. The resulting silica aquasol is then collected in a suitable receiving vessel and centrifuged prior to packaging or it may be centrifuged to remove small amounts of unconverted gel or mud and then stored and/or packaged. The foregoing process is particularly adapted for large scale commercial production in that it enables the efficient preparation of silica aquasols in a large autoclave and eliminates to a substantial extent the formation of scale on the autoclave walls and also substantially reduces the mud content of the final product.

The proportions of silica aquagel and silica aquasol employed may be varied to a considerable extent depending upon the size and shape of the autoclave or other pressure resistant vessel employed, the heating cycle and temperature used, and the concentration of the silica aquagel and silica aquasol. It has presently been found that the size and shape of the autoclave employed have a considerable effect on the ratio of silica aquasol to silica aquagel which may be used in the above described process. Thus in an autoclave having a diameter of 12 inches or less it is possible to use small ratios of silica aquasol to silica aquagel, that is, as low as about 0.25 to 0.3 part of silica aquasol for each part of silica aquagel. On the other hand, from about 0.5 to 1 part of silica aquasol to each part of aquagel has been found to give satisfactory results in autoclaves having a diameter above about 12 inches. It is preferred in commercial scale operations to employ at least 0.3 part of silica aquasol for each part of silica aquagel charged to the autoclave. Larger amounts of silica aquasol may be used in any event. However, outside of decreasing the heating period required such amounts offer no particular advantage, and have the disadvantage of decreasing the efficiency of the process.

It is essential that the silica aquasol employed in the process be alkaline reacting, that is, contain a free basic compound. The amount of free basic compound present in the silica aquasol may be varied to a certain extent depending upon the heating cycle used, the pH desired in the final product and the amount of silica aquagel initially charged to the system. Satisfactory results are obtained by using an alkaline reacting silica aquasol which contains at least 0.005 mol of free basic compound (calculated as NaOH) for each mol of silica in the silica aquagel. If smaller amounts of basic compound are present there is generally an inadequate conversion of aquagel to aquasol. It is generally desirable to avoid high concentrations of free basic compound in the silica aquasol used since such concentrations not only affect the stability of the aquasol, but also adversely affect the conversion of the silica aquagel to silica aquasol. Satisfactory results have been obtained in accordance with this invention by employing a silica aquasol which contains as much as 0.01 mol of free basic compound (calculated as NaOH) for each mol of silica present in the silica aquagel. By operating within the above described range of proportions of free basic compound in the silica aquasol to the amount of silica in the silica aquagel, it is possible to prepare silica aquasols having a pH between about 8.5 and 10.5. However, it is preferred to employ an amount of free basic compound in the silica aquasol which is sufficient to convert the silica aquagel and silica aquasol mixture into a silica aquasol having a pH between about 9.5 and 10.2.

As examples of free basic compounds which are employable in the silica aquasol may be mentioned alkali metal silicates such as sodium silicate, potassium silicate and the like, alkali metal hydroxide such as sodium hydroxide, potassium hydroxide and the like and quaternary ammonium hydroxides such as trimethyl benzyl ammonium hydroxide, tetramethyl ammonium hydroxide and the like. Ammonia, ammonium hydroxide, alkali metal carbonates such as sodium and potassium carbonate and other substances which ionize in water solutions to yield hydroxyl ions are also capable of being used in the present invention. It is preferred, however, to employ alkali metal silicates and especially sodium silicate for the purpose of furnishing the proper amount of free basic compound for use in the process hereinbefore described since silica is introduced at the same time and the product is not diluted to the same extent as when other free basic compounds are used.

In carrying out the present invention it is generally desirable to heat the mixture of silica aquagel and silica aquasol to temperatures corresponding to steam pressures of 180 to 200 pounds per square inch (gauge). Temperatures corresponding to steam pressure of 180 to 200 pounds per square inch (gauge) are preferred since the rate of conversion of silica aquagel to silica aquasol is more rapid at such temperatures. The duration of heating may be varied considerably depending upon the size and shape of the autoclave used and the temperatures employed. In general, substantially complete conversion of the silica aquagel to silica aquasol is effected in from 1 to 8 hours depending on the size and shape of the autoclave and the silica concentration of the aquagel. However, longer heating periods are not necessarily detrimental and may even be desirable in some instances depending upon the type of aquasol prepared and the size and shape of the autoclave employed.

Boiling of the silica aquagel-silica aquasol mixture during heating period or cycle should be substantially prevented, otherwise the formation of "mud" is favored. "Mud" is a term used herein to define a non-dispersible, gelatinous type of precipitate which is obtained along with silica aquasol on discharging the contents of the autoclave or similar pressure resistant vessel. Boiling of the mixture is substantially prevented in accordance with the present invention by employing a substantially tight autoclave which is substantially filled with aquagel and aquasol or a tight autoclave which has only about 10% free volume, or by directing live steam into the free volume in the autoclave over the surface of the mixture of silica aquagel and silica aquasol. When live steam is employed in this manner, it is preferred to use steam having a temperature at least equal to or higher than the temperature of the silica aquasol-silica aquagel mixture. In this manner, condensation of the steam and subsequent dilution of the product is substantially avoided.

The silica aquagels employed in the processes of the present invention may be prepared in various ways. However, it is essential that they be substantially neutral, that is, be substantially free of acid, and contain little or no salt or electrolyte. The size of the silica aquagel particles may be varied to some extent depending upon the size and shape of the autoclave employed. In general, pieces or lumps of silica aquagel larger than about 1 inch square should not be used because of the difficulty involved in washing them free of salts and acid. Moreover, large lumps require long heating periods for complete conversion to silica aquasol.

A satisfactory method of preparing suitable silica aquagels of the type described for use in the present invention is to add an aqueous solution of an alkali metal silicate such as sodium and/or potassium silicate, preferably sodium silicate, to a mineral acid such as sulfuric acid, hydrochloric acid and the like with vigorous agitation and stopping the addition while the product is still acid reacting. It is preferred to prepare acid reacting mixtures which have a pH between about 2 and 4. This mixture soon sets up into a gel. The gel is preferably allowed to synerize for several hours and is then crushed into lumps. The gel lumps are then washed with water until substantially free of salts or electrolytes, at which time they are substantially neutral. The silica aquagel so prepared is now ready for use in the processes of the present invention. By following the above procedure, it is possible to prepare silica aquagels containing various concentrations of silica. Silica aquagels containing between about 9 and 14% silica are generally most suitable for use in the present invention.

The heat stable, alkaline reacting silica aquasols which are employed together with the silica aquagel in the processes of the present invention may be prepared in a variety of ways. Thus, they are suitably prepared by first preparing an aquagel by reacting an acid with a water-soluble silicate, washing the resulting gel with water to remove the electrolytes formed during the reaction, covering the gel with a weak aqueous solution of sodium hydroxide and, after removing the gel from solution, heating the gel while avoiding evaporation of water, until substantially all of the gel is converted to a sol. Such method is described in greater detail in the patent to John F. White, No. 2,375,738. Such silica aquasol may be adjusted to the proper free basic compound content by adding thereto suitable quantities of one or more of the free basic compounds hereinbefore described. Silica aquasols prepared by the processes described herein may also be employed.

The two types of silica aquasols described immediately above are preferably employed in the processes of the present invention since they are quite stable and are not appreciably affected by heat. However, it is also possible to employ other alkaline reacting silica aquasols which are stable to heat and the free basic compound and concentrations employed in the present processes. Thus, it is possible to employ silica aquasols which have been prepared by first passing dilute water solutions of sodium silicate through a bed of cation exchange material such as zeolite and then concentrating the resulting colloidal solution. Silica aquasols which have been prepared by the dialysis of an acid reacting mixture of sodium silicate and sulfuric acid and then alkalized and further dialyzed may also be employed. Both of the above described silica aquasols may be rendered heat stable by a preliminary heat treatment.

It is generally possible to prepare the above described silica aquasols in various concentrations e. g. sols containing between about 3 and 20% $SiO_2$ Such aquasols may be employed directly in the process described herein after they have been adjusted to the proper free basic compound content. When it is desired to prepare concentrated silica aquasols in accordance with the present invention, it is preferred to employ alkaline reacting silica aquasols which contain more than 10% $SiO_2$.

A further understanding of the present invention will be obtained from the following examples which are intended to be illustrative of the present invention, but not limitative of the scope thereof, parts and percentages being by weight unless otherwise specified.

EXAMPLE I

A. *Preparation of silica aquasol I*

One hundred and thirty-seven parts of 66° Bé. $H_2SO_4$ were diluted with 716 parts of water and charged to a mixing tank. A silicate solution was then prepared by diluting 944 parts of a sodium silicate solution analyzing 8.9% $Na_2O$ and 29% $SiO_2$ with 754 parts of water. The silicate solution was then added to the sulfuric acid solution with stirring. After the addition was completed, stirring was discontinued and the mixture soon set up as a gel. The gel was allowed to synerize for 16 hours and the syneresis liquor was then drained from the gel. The synerized gel was crushed into lumps of 1 inch cross section and the gel lumps were then washed with a continuous flow of water for 16 hours. The washed gel was then covered with 1500 parts of water containing 1.8 parts of NaOH. After standing 6 hours, the excess solution was drained off and the gel was charged to an autoclave. The gel was heated for 3 hours, using steam at 215 pounds per square inch absolute pressure in the jacket of the autoclave. The contents of the autoclave were then blown out and the resulting aquasol was then centrifuged. This sol analyzed about 12.5% $SiO_2$, 0.05% $Na_2SO_4$ and 0.075% NaOH. It had a pH of about 9.2. This sol was concentrated by evaporation until it contained about 15% $SiO_2$.

B. *Preparation of silica aquagel*

Six thousand two hundred and sixty-five parts of a water solution containing 19.2% sodium silicate (analyzing 1 part of $Na_2O$ to 3.1 parts of $SiO_2$) were added with thorough agitation to 4200 parts of aqueous hydrochloric acid solution (containing 1390 parts of 31% HCl). The addition of sodium silicate was discontinued when the pH of the resulting mixture was about 4 (glass electrode). The temperature of the mixture was maintained at about 22° C. during the mixing and after the mixing was discontinued. The mixture was allowed to set up into a gel over a period of 6 hours and the gel was then broken up or crushed into lumps of ½ inch to 1 inch cross section. The gel lumps were washed for 14 hours with water at a temperature of 21° C. At the end of this period the gel was substantially free of sodium chloride and other electrolytes. The gel contained about 11.6% $SiO_2$.

C. *Preparation of silica aquasol II*

One thousand and one hundred parts of silica aquasol I (as prepared under A above), containing about 0.075% NaOH, was adjusted to 10.5 pH (glass electrode) by the addition of a 10% sodium silicate solution. The resulting solution contained about 0.246% free basic compound calculated as NaOH. This colloidal solution was charged to a steam jacketed autoclave. Two thousand one hundred and eighty-eight parts of silica aquagel (prepared as described under B above) were then charged to the autoclave. The autoclave had a capacity of about 1 gallon and was substantially filled with the above charge. The autoclave jacket was heated with steam at 200 pounds per square inch (gauge) and the interior of the autoclave, above the batch, was also subjected to steam at 200 pounds per square inch. The autoclave was heated for a period of 1¼ hours, after which, the batch was cooled down and drained from the autoclave. The resulting product was substantially all silica aquasol and only contained about 0.5% mud by volume. The autoclave was substantially free of scale and mud. The product had a pH of about 9.5 (glass electrode) and contained 0.058% free basic compound calculated as NaOH.

The process described above can be repeated in the same autoclave for a large number of runs e. g. up to 50 runs before descaling of the autoclave is required, whereas in the preparation of silica aquasol I (in the beginning of this example) the autoclave can only be used for 5 runs before descaling is required.

EXAMPLE II

A steam jacketed autoclave (28 inches internal diameter and 11 foot length) was almost completely filled with silica aquagel (as prepared under B in Example I) and silica aquasol II (the product prepared in accordance with Example I), which had been adjusted to pH 10.5 with 10% sodium silicate solution, using 2 parts of gel for each part of aquasol. The autoclave jacket was heated with steam at 200 pounds per square inch (gauge) and the interior of the autoclave above the batch was subjected to steam at 200 pounds per square inch (gauge). The batch was heated for 8 hours and the contents were then blown out of the autoclave. The resulting silica aquasol contained about 1% mud by volume which was readily removed by centrifuging. The aquasol had a pH of about 9.5. The autoclave was substantially free of scale and mud.

A silica aquasol prepared in the same autoclave according to the procedure given for silica aquasol I as described in Example I contained about 10% mud by volume, which mud was difficult to separate from the aquasol. Moreover, the autoclave contained a noticeable layer of scale on the heat exchange surface.

Silica aquasols prepared in accordance with the processes described herein are suitable for a wide variety of uses and are stable for periods up to 12 months and longer. They may be concentrated by evaporation, by vacuum distillation and the like to high silica concentrations and are readily diluted with water without precipitation of silica. Moreover, they may be acidified by careful addition of acid to yield acid reacting sols. Organic solvents may be added to these aquasols to provide acid or alkaline reacting organo-aquasols.

The foregoing silica aquasols may be used for coating paper, for improving the slip resistance of textile fabrics and knit goods and for improving the strength of cotton, wool and other yarns by adding the sols to the fibers prior to spinning. Such silica aquasols are useful for many other purposes as will be apparent to those skilled in the art.

What is claimed is:

1. The method of converting silica aquagel to silica aquasol which comprises heating a mixture of heat stable, alkaline reacting silica aquasol and substantially neutral silica aquagel, which aquagel is substantially free of electrolytes, in a closed system at temperatures above about 125° C. while substantially preventing boiling of said mixture, said mixture containing at least 0.25 part by weight of aquasol for each part by weight of aquagel, said alkaline reacting silica aquasol containing at least 0.005 mol of free basic compound (calculated as NaOH) for each mol of silica in said silica aquagel.

2. The method of converting silica aquagel to silica aquasol which comprises heating a mixture comprising between about 0.25 and 1 part by weight of heat stable alkaline reacting silica aquasol and 1 part by weight of substantially neutral silica aquagel, which is substantially free of electrolytes, in a closed system at temperatures above about 125° C. while substantially preventing boiling of said mixture, said alkaline reacting silica aquasol containing at least 0.005 mol of free basic compound (calculated as NaOH) for each mol of silica in said silica aquagel.

3. The method of converting silica aquagel to silica aquasol which comprises heating a mixture comprising between about 0.25 and 1 part by weight of heat stable, alkaline reacting silica aquasol and 1 part by weight of substantially neutral silica aquagel, which is substantially free of electrolytes, in a closed system at temperatures corresponding to steam pressures between about 60 and 200 pounds per square inch (gauge) while substantially preventing boiling of said mixture, said alkaline reacting silica aquasol containing between about 0.005 and 0.01 mol of free basic compound (calculated as NaOH) for each mol of silica in said silica aquagel.

4. The method substantially according to claim 3 but further characterized in that the free basic compound is sodium silicate.

5. The method substantially according to claim 3 but further characterized in that the free basic compound is potassium silicate.

6. The method substantially according to claim 3 but further characterized in that the free basic compound is sodium hydroxide.

7. The method substantially according to claim 3 but further characterized in that the boiling of the mixture is substantially prevented by introducing live steam at a pressure of about 60 to 200 pounds per square inch (gauge) into the closed system.

8. The method of converting silical aquagel to silica aquasol which comprises heating a mixture comprising between about 0.25 and 1 part by weight of heat stable alkaline reacting silica aquasol containing between 3 and 20% by weight of $SiO_2$ and 1 part by weight of substantially neutral silica aquagel, which aquagel is substantially free of electrolytes and contains between about 9 and 14% by weight of $SiO_2$, in a closed system at temperatures corresponding to steam pressures between about 60 and 200 pounds per square inch (gauge) for a period between 1 and 8 hours while substantially preventing boiling of said mixture, said alkaline reacting silica aquasol containing between about 0.005 and 0.01 mol of a compound selected from the group consisting of sodium silicate and sodium hydroxide (calculated as NaOH) for each mol of silica in said silica aquagel.

HENRY S. TRAIL.

REFERENCES CITED

The following references are of record in the file of this patent:

UNITED STATES PATENTS

| Number | Name | Date |
| --- | --- | --- |
| 2,285,449 | Marshall | June 9, 1942 |
| 2,375,738 | White | May 8, 1945 |
| 2,443,512 | Powers et al. | June 15, 1948 |